(12) United States Patent
Bernett et al.

(10) Patent No.: US 9,230,598 B1
(45) Date of Patent: Jan. 5, 2016

(54) METHODS AND DEVICES FOR MITIGATING GAS LEAKAGE THROUGH AN ADHESIVE

(71) Applicant: SEAGATE TECHNOLOGY LLC, Cupertino, CA (US)

(72) Inventors: Frank Bernett, Niwot, CO (US); Tave Fruge, Louisville, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/689,145

(22) Filed: Apr. 17, 2015

(51) Int. Cl.
*G11B 25/04* (2006.01)
*G11B 33/12* (2006.01)
*G11B 33/14* (2006.01)

(52) U.S. Cl.
CPC ............ *G11B 25/043* (2013.01); *G11B 33/122* (2013.01); *G11B 33/1446* (2013.01); *G11B 33/1466* (2013.01)

(58) Field of Classification Search
USPC .................................. 360/99.23, 99.24, 99.25
See application file for complete search history.

(56) References Cited

U.S. PATENT DOCUMENTS

| | | | |
|---|---|---|---|
| 5,357,386 A * | 10/1994 | Haidari et al. | 360/99.18 |
| 5,508,860 A * | 4/1996 | Takagi et al. | 360/99.16 |
| 5,541,787 A * | 7/1996 | Jabbari et al. | 360/99.16 |
| 5,609,496 A * | 3/1997 | Kilmer et al. | 439/271 |
| 5,646,801 A * | 7/1997 | Boigenzahn et al. | 360/99.16 |
| 5,931,697 A * | 8/1999 | Jeong | 439/556 |
| 5,966,267 A * | 10/1999 | Hooley et al. | 360/99.16 |
| 6,168,459 B1 * | 1/2001 | Cox et al. | 439/495 |
| 6,678,112 B1 * | 1/2004 | Kaneko | 360/99.18 |
| 6,754,041 B2 * | 6/2004 | Hong et al. | 360/99.18 |
| 6,970,322 B2 * | 11/2005 | Bernett | 360/99.18 |
| 6,989,493 B2 * | 1/2006 | Hipwell et al. | 174/151 |
| 7,019,942 B2 * | 3/2006 | Gunderson et al. | 360/99.25 |
| 7,123,440 B2 * | 10/2006 | Albrecht et al. | 360/99.18 |
| 7,137,196 B2 * | 11/2006 | Gunderson et al. | 29/884 |
| 7,294,007 B1 * | 11/2007 | Lawlyes | 439/276 |
| 7,361,844 B2 * | 4/2008 | Vinciarelli et al. | 174/260 |
| 7,599,147 B2 * | 10/2009 | Gunderson | 360/97.22 |
| 7,914,858 B1 * | 3/2011 | deJesus et al. | 427/585 |
| 8,059,364 B1 * | 11/2011 | Andrikowich et al. | 360/99.22 |
| 8,194,348 B2 * | 6/2012 | Jacoby et al. | 360/99.25 |
| 8,324,771 B2 * | 12/2012 | Yawata et al. | 310/71 |
| 8,749,914 B2 * | 6/2014 | Otake et al. | 360/97.12 |
| 8,908,318 B2 * | 12/2014 | Lee | 360/97.11 |
| 2006/0002067 A1 * | 1/2006 | Gunderson et al. | 361/683 |
| 2006/0050429 A1 * | 3/2006 | Gunderson et al. | 360/97.01 |

\* cited by examiner

*Primary Examiner* — Brian Miller
(74) *Attorney, Agent, or Firm* — Braden Katerheinrich

(57) ABSTRACT

In certain embodiments, an apparatus includes a basedeck for a hard disc drive. The basedeck includes an interior surface for supporting disc drive components and an exterior surface. The basedeck includes a cavity in either the exterior surface or interior surface. The cavity includes at least two pads for supporting an electrical connector.

15 Claims, 7 Drawing Sheets

METHODS AND DEVICES FOR MITIGATING GAS LEAKAGE THROUGH AN ADHESIVE

SUMMARY

In certain embodiments, an apparatus includes a basedeck for a hard disc drive. The basedeck includes an interior surface for supporting disc drive components and an exterior surface. The basedeck includes a cavity in either the exterior surface or interior surface. The cavity includes at least two pads for supporting a conductive bulkhead.

DETAILED DESCRIPTION

Data storage devices can be filled with air or a lower density gas, such as helium, and sealed to control and maintain a storage device's internal environment. Sealing mitigates or prevents leakage of internal gases from within the storage device. One potential source of leaks in a data storage device involves areas around bulkheads, which facilitate transmission of electrical signals to and from the storage device. Bulkheads can be coupled or joined to storage devices by, among other things, fasteners, gaskets, solder, welds, adhesives or a combination of such.

When an adhesive is used to couple or join a bulkhead to a storage device, the adhesive is applied in the area between the bulkhead and storage device. The adhesive can be a source of leakage. Applicants have found that leak rates of adhesive joints are somewhat inversely proportional to a thickness of the adhesive. Moreover, structural integrity of the adhesive joint is somewhat proportional to the thickness of the adhesive. Certain embodiments of the present disclosure are accordingly directed to systems, devices, and methods for controlling dimensions of adhesives.

Figure 1:
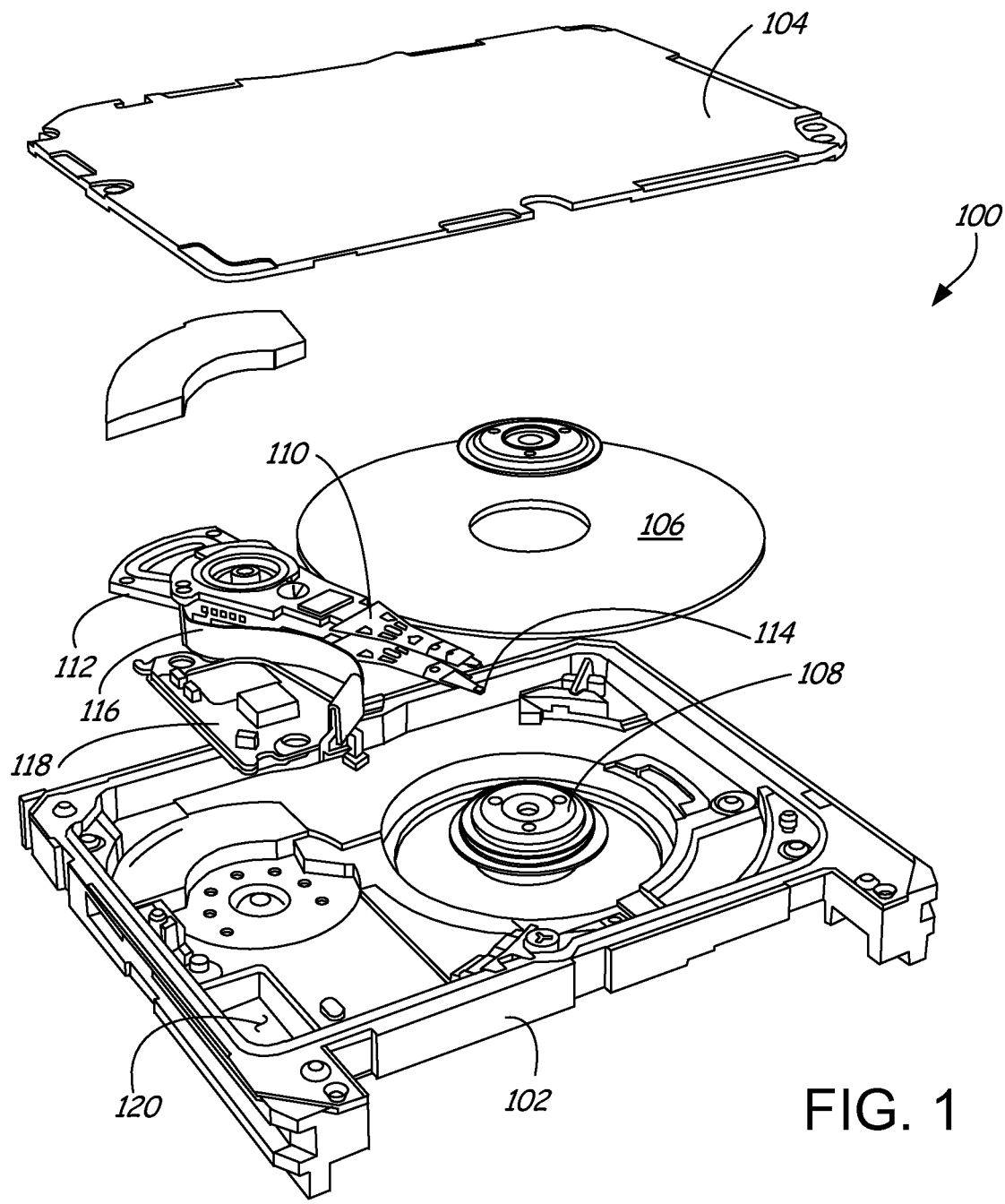
FIG. 1 provides an isometric exploded view of a hard disk drive, in accordance with certain embodiments of the present disclosure.

FIG. 1 shows a hard disk drive 100 including a basedeck 102, top cover 104, and various data storage components. The basedeck 102 and top cover 104 can form a housing for components such as magnetic disks 106 for recording and storing data, a spindle motor 108 to rotate the disk 106, a head stack assembly (HSA) 110, and an actuator 112. The HSA 110 includes a magnetic head 114. The actuator 112 is coupled to the magnetic head 114 and moves the magnetic head 114 by operation of a voice coil motor to position the magnetic head 114 over the rotating disk 106. The magnetic head 114 records data to or reproduces data from the disk 106. That data is transmitted to a printed circuit board (PCB) by a flexible printed circuit 116 via a conductive bulkhead 118. The PCB is positioned at an outer portion of the base 102.

A through hole 120 in the basedeck 102 enables the flexible printed circuit 116 to connect to the PCBA positioned outside the base 102 via a conductive bulkhead 118. The through hole 120 and area around the bulkhead 118 can be a potential source of leaks of the internal gas atmosphere of the hard disk drive 100. Accordingly, the present disclosure features methods and devices for mitigating gas leakage around through holes and bulkheads.

Figure 2:
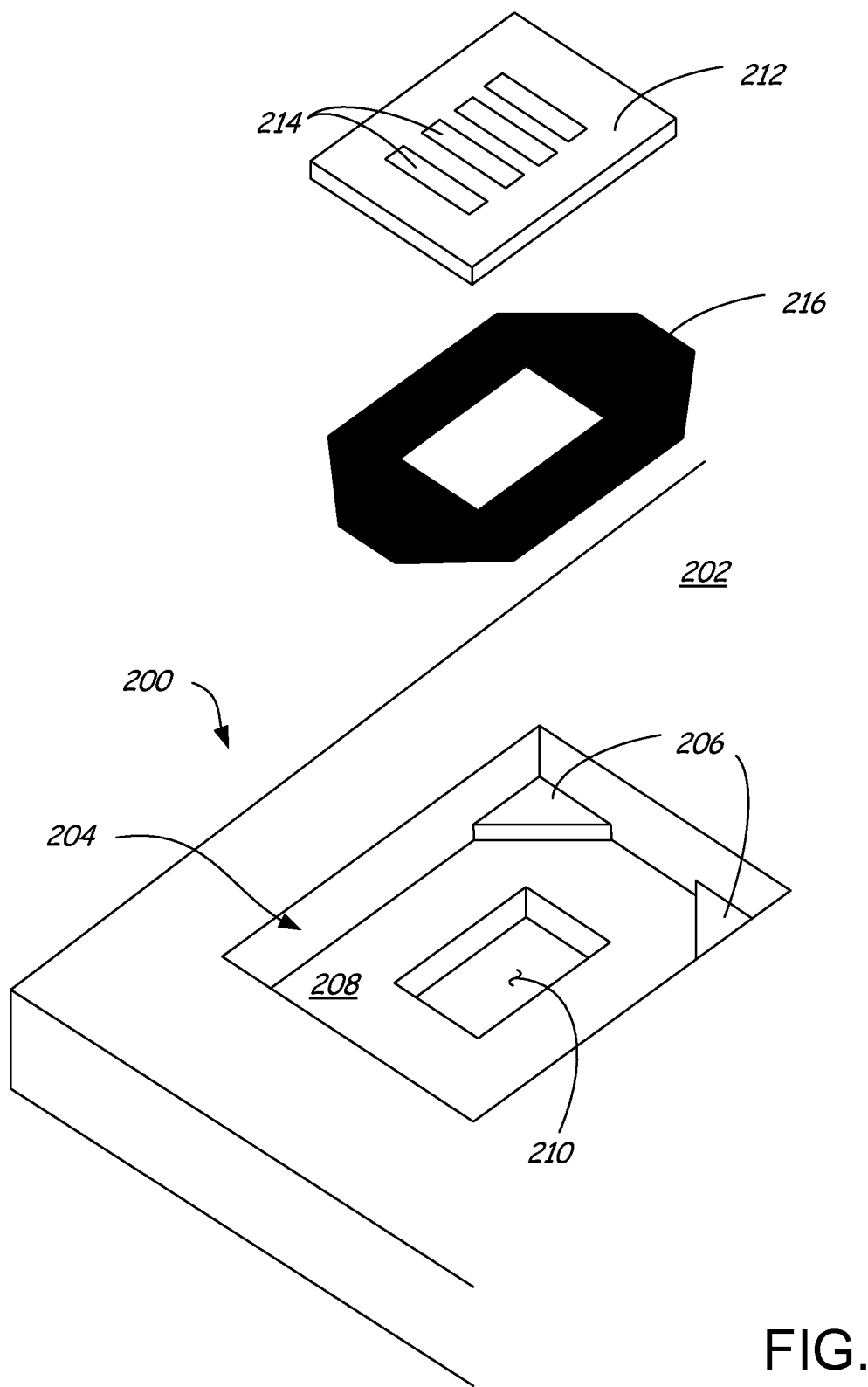
FIG. 2 provides a partial, isometric view of a bottom of a hard disk drive base, in accordance with certain embodiments of the present disclosure.
Figure 3:
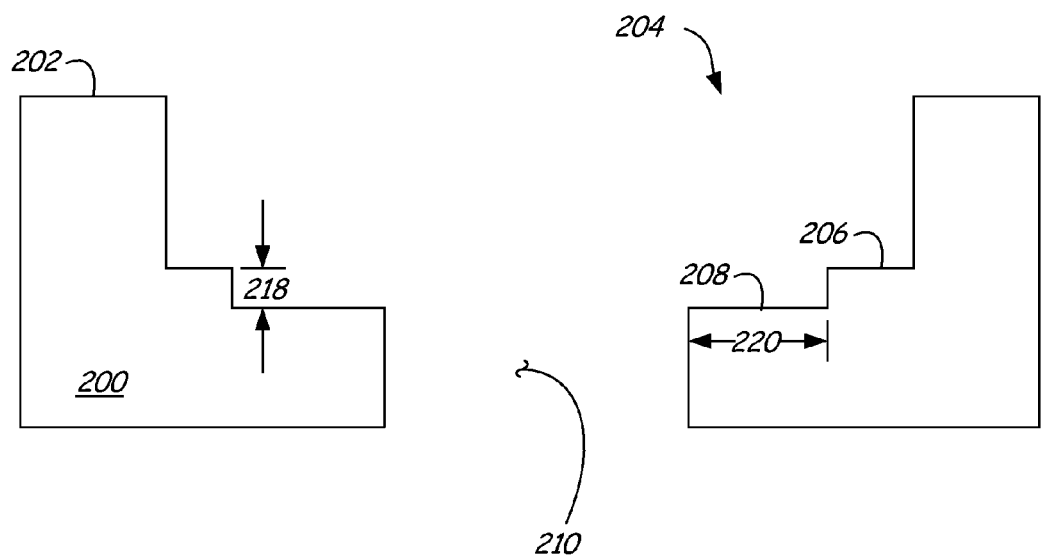
FIG. 3 provides a side view of a cavity in a hard disk drive base, in accordance with certain embodiments of the present disclosure.

FIGS. 2 and 3 partially show a base 200 of a hard disk drive. The bottom surface 202 of the base 200 includes a cavity 204. Internal to the cavity 204 are pads 206 shown as being positioned in corners of the cavity 204 and protruding from a bottom surface 208 of the cavity 204. The bottom surface 208 defines a through hole 210. The through hole 210 extends from the bottom surface 208 of the cavity 204 to the base's 200 interior surface, which houses and supports disk drive components like a spindle motor, voice coil motor, and an actuator. The figures in the present disclosure show cavities in the bottom surface of the base, but the disclosure is not so limited. Applicants recognize that cavities can be featured in the interior surface.

FIG. 2 shows a conductive bulkhead 212, which can be positioned in the cavity 204. The conductive bulkhead can be made of a number of materials, including a low temperature co-fired ceramic (LTCC). When made of an LTCC material, the conductive bulkhead 212 is substantially impermeable to helium or other low density gases. The bulkhead 212 includes conductors 214 that enable transmission of electrical signals to and from the hard disk drive. When using an adhesive 216 to bond or join the bulkhead 212 to the base 200, the adhesive joint is the primary leak path around the bulkhead 212.

The bulkhead 212 is joined to the base by first applying a bead or line (e.g., bond line) of adhesive to the bottom surface 208 of the cavity 204. When applied, the adhesive is in an uncured state. The bulkhead 212 is damped or positioned in the cavity 204 while the adhesive cures. The clamping or positioning of the bulkhead 212 compresses the bond line and causes the adhesive to spread, which may squeeze out some of the uncured adhesive. As such, the cavity may additionally include a channel formed in the base to accommodate excessive squeeze out of the adhesive and therefore avoid interference of the adhesive with conductors on the bulkhead.

When positioned in the cavity 204, the bulkhead 212 sits atop the pads 206 protruding from the bottom surface 208 such that the configuration creates a space between the bulkhead 212 and the bottom surface 208 of the cavity 204. This space is arranged to contain the adhesive, which couples the bulkhead 212 to the bottom surface 208 of the cavity 204 and creates a seal that mitigates gas leakage from an interior portion of the hard disk drive. Dimensions of the adhesive are controlled by the size, shape, depth of the pads 206. For example, the height of the pads (or alternatively, the depth of the pocket defined by protrusions) defines a thickness of the adhesive. The dimension for the height of the pads is shown by reference number 218. The width of the adhesive is shown by reference number 220. The wider and thinner the adhesive, the more restrictive the adhesive is to leakage (e.g., transmission of low density gas through the adhesive). However, if the adhesive is too thin, then structural integrity of the joint becomes a problem. For example, the weaker the adhesive is, the more susceptible the joint is to cracking at the due to thermal mismatch of the materials. Moreover, if the adhesive is too thin, during squeeze out, the adhesive may not flow properly which can cause voids in the cured adhesive. In some configurations, Applicants have found adhesives with a height of 0.002 inches and width of 0.110 inches provides both sufficient leakage mitigation and structural integrity for joining and maintaining a joint of a bulkhead to a hard disk drive base.

Figure 4:
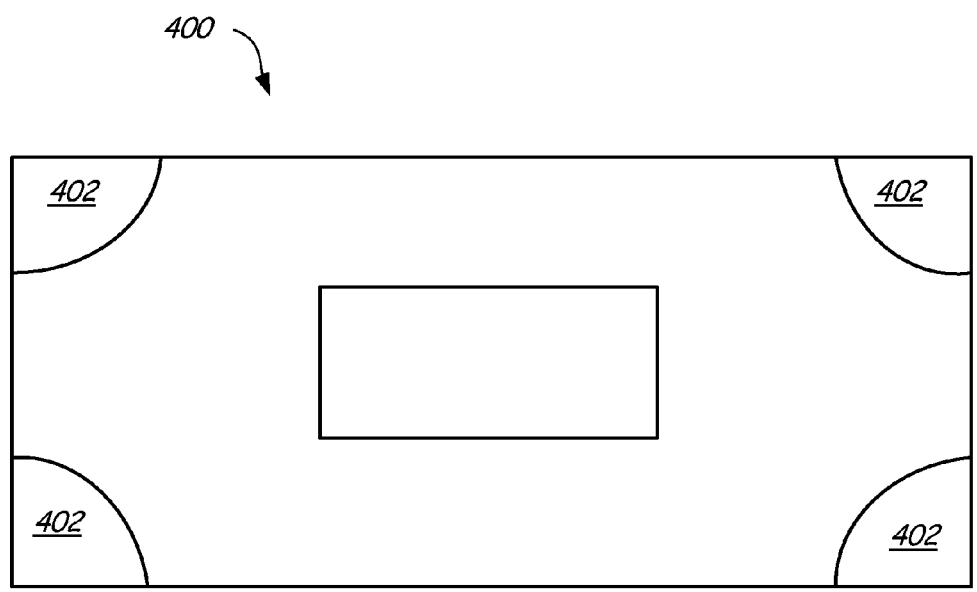
FIGS. 4 and 5 provide top views of cavities in a hard disk drive base, in accordance with certain embodiments of the present disclosure.
Figure 5:
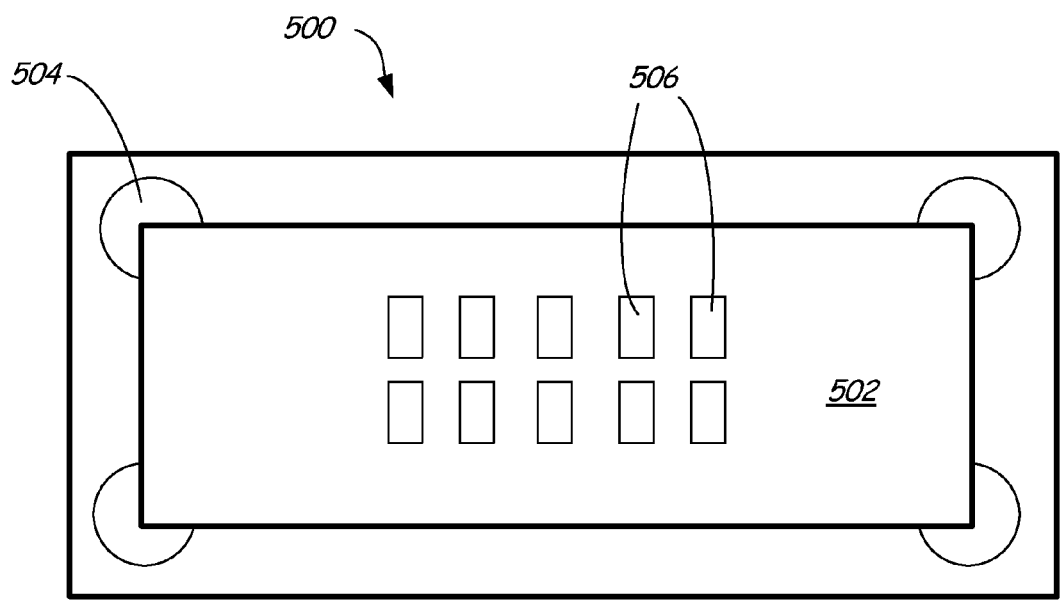

FIGS. 4 and 5 provide views of cavities in a hard disk drive base, in accordance with certain embodiments of the present disclosure. These figures show that pads positioned in the cavity can be shaped and positioned a variety of configurations. FIG. 4 shows a cavity 400 with four pads 402 positioned in corners of the cavity and curved. The pads 402 can be created by machining and therefore may be integral to and made of the same material as the base of a hard disk drive. Alternatively, the pads may be a separate part and need to be positioned and joined to the base of a hard disk drive. FIG. 5 shows a top view of a cavity 500 with a bulkhead 502 positioned in the cavity 500. The bulkhead 502 rests on pads 504 positioned in the bottom of the cavity 500. The bulkhead 502 has various electrical conductors 506, which facilitate transmission of electrical signals through the bulkhead 502 and thus to and from a hard disk drive.

Figure 6:
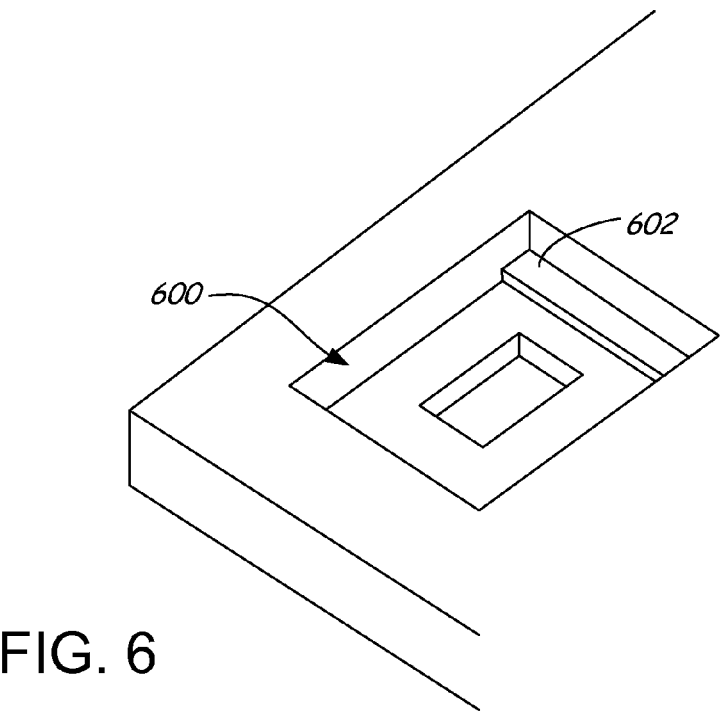
FIGS. 6 and 7 provide partial, isometric views of a bottom of a hard disk drive base, in accordance with certain embodiments of the present disclosure.
Figure 7:
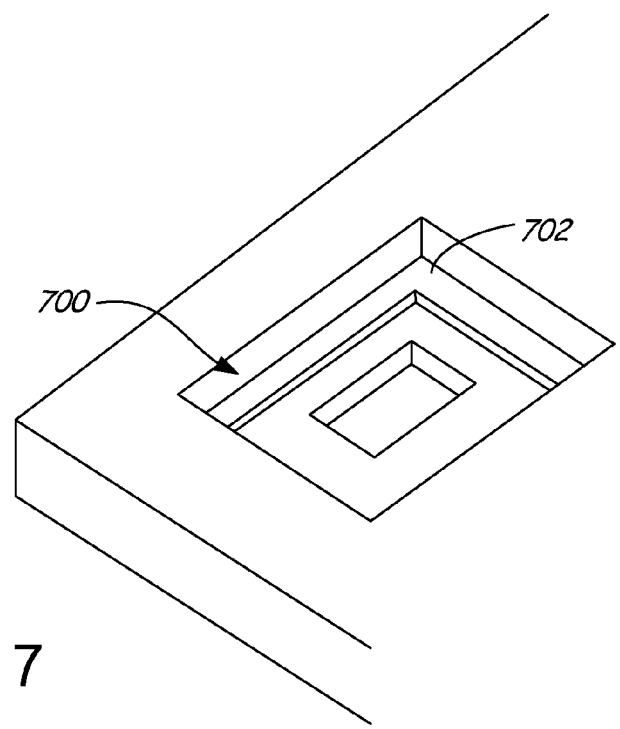

FIGS. 6 and 7 provide views of cavities 600, 700 in a hard disk drive base. The cavities 600, 700 have steps or protrusions 602, 702 in different configurations. In FIG. 6, the cavity 600 has two steps 602 (one not shown) on opposite ends of the cavity 600. In FIG. 7, the cavity 700 has a single step 702 that wraps around the entire cavity 700.

Figure 8:
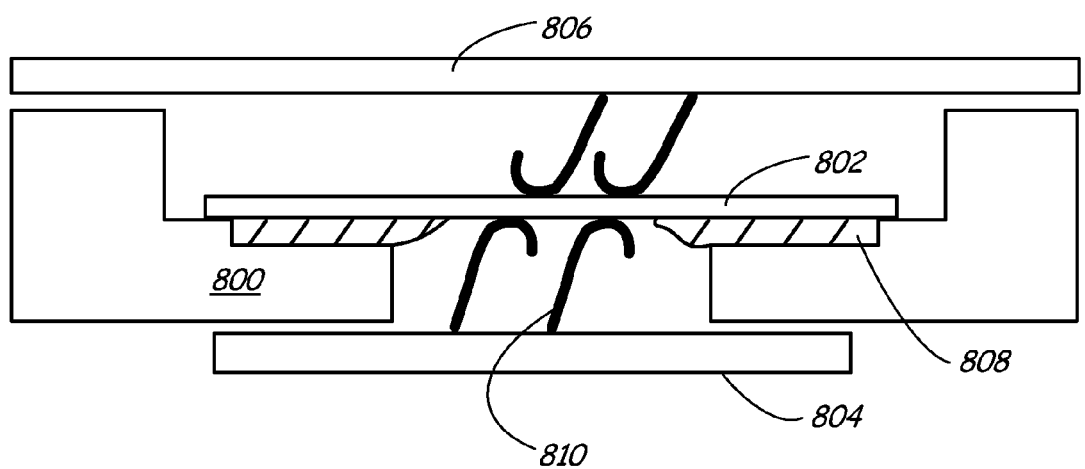
FIG. 8 provides a partial side view of a hard disk drive base and conductive bulkhead, in accordance with certain embodiments of the present disclosure.

FIG. 8 shows a hard disk drive base 800, a conductive bulkhead 802, electrical connector 804, and a printed circuit board (PCB) 606, in accordance with certain embodiments of the present disclosure. The bulkhead 802 is positioned in a cavity of the base 800 and outside an internal housing of the hard disk drive. The electrical connector 804 is positioned inside the hard disk drive. The PCB 806 is mechanically coupled to the base 800 and is positioned outside the hard disk drive. The bulkhead 802 is mechanically coupled to the base 800 by an adhesive 808. The bulkhead 802 and electrical connector 804 and PCB 806 are electrically coupled by electrical contacts 810 to a bulkhead's conductors—thus facilitating transmission of electrical signals to and from the hard disk drive.

Figure 9:
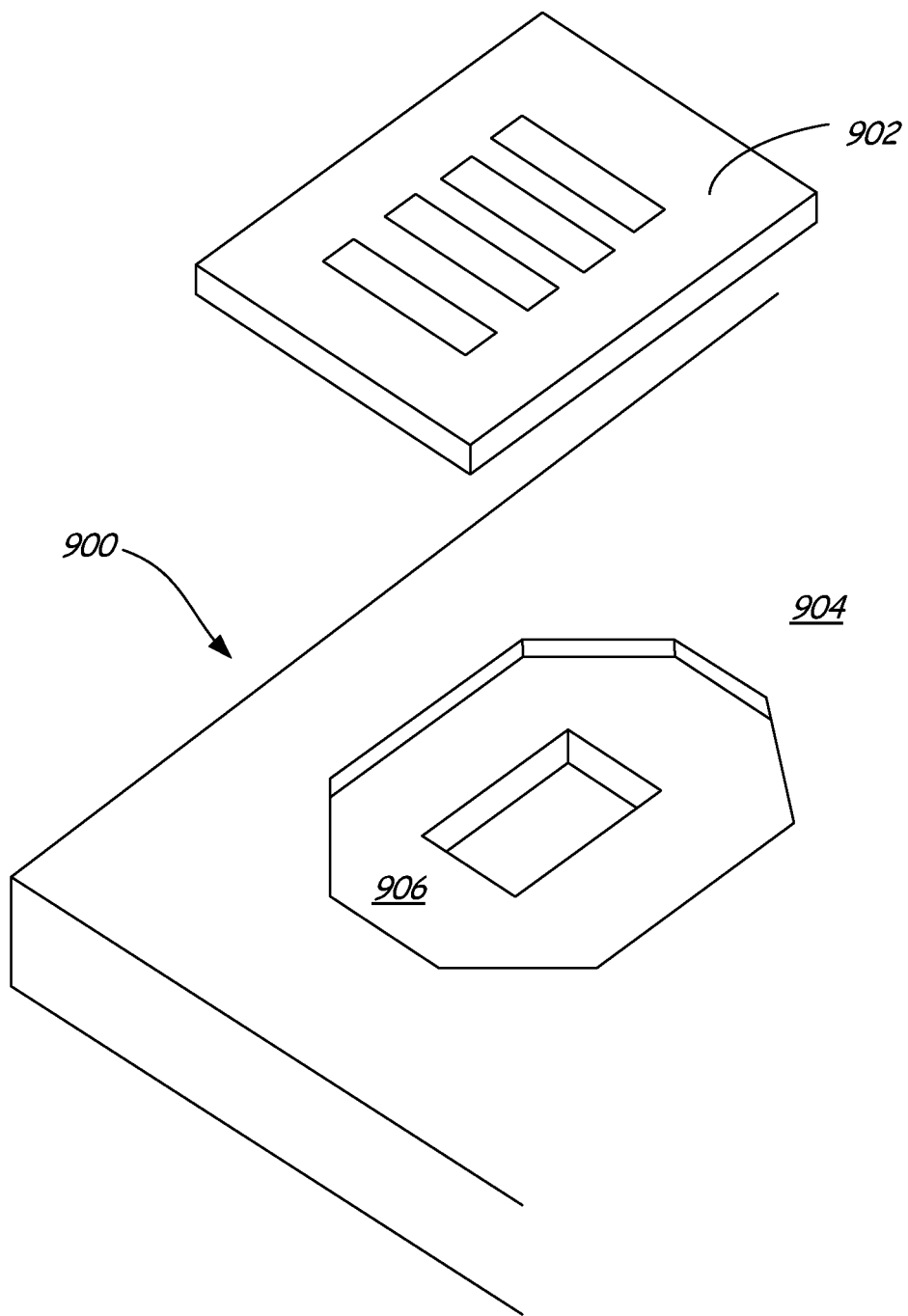
FIGS. 9 and 10 provide partial, isometric views of a bottom of a hard disk drive base, in accordance with certain embodiments of the present disclosure.

FIG. 9 shows a hard disk drive base 900 and bulkhead 902. The base 900 has a bottom surface 904 with a cavity 906. In this embodiment, the bulkhead 902 is not positioned within the cavity 906. Instead, the bulkhead 902 is configured to have its corners rest on the bottom surface 904 such that the bulkhead covers the cavity 906. The bulkhead 902 is attached to the base 900 by an adhesive. Dimensions of the adhesive are controlled by the size, shape, depth of the cavity 906.

Figure 10:
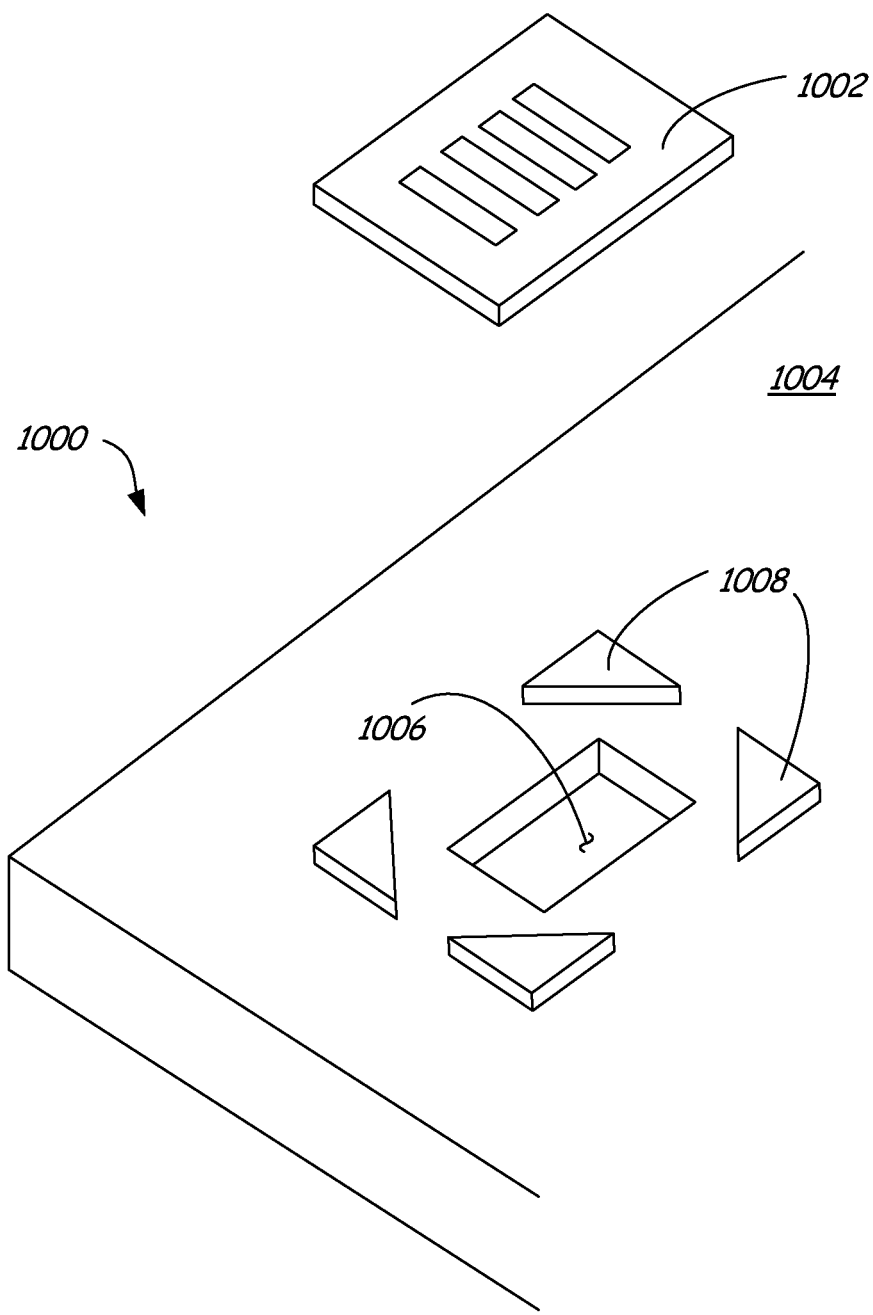

FIG. 10 shows a hard disk drive base 1000 and bulkhead 1002. The base 1000 has a bottom surface 1004 with a through hole 1006 and four protrusions 1008 positioned around the through hole 1006. The bulkhead 1002 is configured to have its corners rest on the protrusions 1008 such that the bulkhead covers the through hole 1006. The bulkhead 1002 is attached to the base 1000 by an adhesive. Dimensions of the adhesive are controlled by the size, shape, depth of the protrusions 1008 as described above.

FIGS. 9 and 10 show that the bulkhead is positioned external to the hard disc drive, but the disclosure is not so limited. Applicants recognize that bulkheads can be positioned in the interior surface along with other hard disc drive components.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
 a basedeck for a disc drive, the basedeck having an interior surface for supporting disc drive components and an exterior surface;
 wherein the basedeck includes a cavity in either the exterior surface or interior surface,
 wherein the cavity includes at least four pads for supporting a bulkhead that is secured to the basedeck by an adhesive.

2. The apparatus of claim 1, wherein the interior surface of the basedeck defines a through hole that extends from the interior surface to the cavity.

3. The apparatus of claim 1, wherein the pads are each positioned in a corner of the cavity.

4. The apparatus of claim 1, further comprising:
 a cover coupled to the basedeck to create a sealed housing for disc drive components including a magnetic head;
 the bulkhead positioned in the cavity and joined to a bottom surface of the cavity by the adhesive, wherein the bulkhead includes electrical conductors; and
 a printed circuit board (PCB) coupled to the basedeck, wherein the bulkhead's electrical conductors transmit electrical signals from the magnetic head to the PCB.

5. The apparatus of claim 1, wherein the pads are integral with the basedeck, and wherein the pads comprise the same material as the basedeck.

6. The apparatus of claim 1, wherein the basedeck includes the cavity in the exterior surface of the basedeck.

7. The apparatus of claim 6, wherein the cavity includes sidewalls extending between the exterior surface and a cavity bottom, wherein the pads extend from the cavity bottom.

8. The apparatus of claim 1, wherein the basedeck includes the cavity in the interior surface of the basedeck.

9. The apparatus of claim 1, wherein the bulkhead comprises a low temperature co-fired ceramic.

10. An apparatus comprising:
 a basedeck for a disc drive, the basedeck having an interior surface for supporting disc drive components and an exterior surface; and
 a bulkhead,
 wherein the basedeck includes at least two protrusions integrally formed with the basedeck and extending from the basedeck for supporting the bulkhead,
 wherein a gap is formed between the interior or exterior surface and the bulkhead, and wherein the gap is filled with an adhesive to secure the bulkhead to the basedeck.

11. The apparatus of claim 10, wherein the basedeck includes only four protrusions extending from the basedeck, and wherein each protrusion is positioned at a corner of the bulkhead.

12. The apparatus of claim 10, wherein the bulkhead comprises a low temperature co-fired ceramic.

13. An apparatus comprising:
 a basedeck for a disc drive, the basedeck having an interior surface for supporting disc drive components and an exterior surface;
 wherein the basedeck defines a cavity in either the interior or exterior surface and wherein the cavity defines at least two individual pads extending from and integral with a bottom surface of the cavity and configured to support a bulkhead, wherein the cavity is at least partially filled with an adhesive for joining the bulkhead to the basedeck.

14. The apparatus of claim 13, wherein the cavity defines only four protrusions extending from the bottom surface of the cavity.

15. The apparatus of claim 13, wherein the bulkhead comprises a low temperature co-fired ceramic.

* * * * *